United States Patent [19]
Lysek

[11] 3,967,023
[45] June 29, 1976

[54] ACCORDION-PLEATED ARTICLE OF MANUFACTURE

[75] Inventor: Franz Lysek, Bielefeld, Germany

[73] Assignee: Moeller-Werke GmbH, Brackwede, Germany

[22] Filed: Jan. 8, 1975

[21] Appl. No.: 539,610

Related U.S. Application Data

[63] Continuation of Ser. No. 339,106, March 8, 1973, abandoned.

[52] U.S. Cl. ............................. 428/102; 193/35 C; 428/103; 428/122; 428/174; 428/182
[51] Int. Cl.² .......................................... B65G 13/00
[58] Field of Search ........... 428/102, 103, 193, 122, 428/174, 182; 193/1, 2 R, 25 S, 25 FT, 35 R, 35 A, 35 C, 35 G

[56] References Cited

UNITED STATES PATENTS 3,411,689  11/1968  Brackett ............................ 428/182

FOREIGN PATENTS OR APPLICATIONS 830,445  2/1952  Germany
1,213,676  3/1962  Germany
1,025,991  4/1966  United Kingdom ................ 428/182

*Primary Examiner*—Marion E. McCamish
*Attorney, Agent, or Firm*—Michael J. Striker

[57] ABSTRACT

An accordion-pleated channel-shaped cover for guide tracks of machines is of single-ply material and has reinforcements of flexible but kink-resistant sheet-material sewn into the interior of its pleats along the outer edge regions thereof.

5 Claims, 3 Drawing Figures

ACCORDION-PLEATED ARTICLE OF MANUFACTURE

This is a continuation of application Ser. No. 339,106, filed on Mar. 8, 1973, now abandoned.

BACKGROUND OF THE INVENTION

The present invention relates to a novel article of manufacture, and more particularly to an accordion-pleated article which is particularly suitable for covering guide tracks and the like of machines, and for similar applications.

Such articles, which may be channel-shaped or tubular, are already known. In some instances the main material of which they are made, e.g. leather, asbestos, artificial leather, is stiffened and reinforced on its entire inwardly directed surface with a lining of synthetic plastic sheet material or the like. Experience has shown, however, that those dual-ply (or even multiple-ply) articles have certain drawbacks. In particular, the linings used do not meet the often very stringent requirements which are made in terms of mechanical strength and thermal resistance.

Other problems which have been encountered have to do with inadequate resistance of the lining materials to attack by water, oil and/or petroleum products, leading to a deterioration of the folding characteristics expected from the articles. Also, the lining material is folded where the pleats of the outer or main material are folded. Because the lining material is often quite stiff, this leads in some instances to a tendency of the article to lift off (bend away from) the guide track or the like which is to be protected. This latter problem can be overcome by incorporating wire guides in the pleats, which counteract this tendency; however, this is evidently not only expensive in terms of labor and additional material required, but it also leads to an often totally undesired increase in the weight of the article.

SUMMARY OF THE DISCLOSURE

It is an object of the invention to provide an improaved article of the type in question, which is free of the disadvantages outlined above.

In keeping with these and other objects which will become apparent hereafter, the invention resides, briefly stated, in an article of the character described which comprises a single-ply elongated element provided with a plurality of accordian pleats each having an outer folded edge region, and reinforcements of flexible but kink-resistant sheet material mounted in the edge regions of at least some of said pleats.

The single-ply material of the element may, for instance, be artificial leather, of a fabric (textile) of cotton or other suitable natural or synthetic fibers, which may be provided on one or both sides with a synthetic plastic coating. The coating is not to be considered a ply, and could be a film of polyvinylchloride or the like.

The reinforcements have inner marginal portions facing the interior of the single-ply element, and outer marginal portions located within the confines of the edge regions. The reinforcements can be secured to the outer edge regions of the pleats by sewing, clamping, bending or welding. If they are sewn in, the seams should be sealed, e.g., by means of a synthetic plastic sealer.

The novel features which are considered as characteristic for the invention are set forth in particular in the appended claims. The invention itself, however, both as to its construction and its method of operation together with additional objects and advantages, will be best understood from the following description of specific embodiments when read in connection with the accompanying drawing.

DESCRIPTION OF THE PREFERRED EMBODIMENTS

Figure 1:
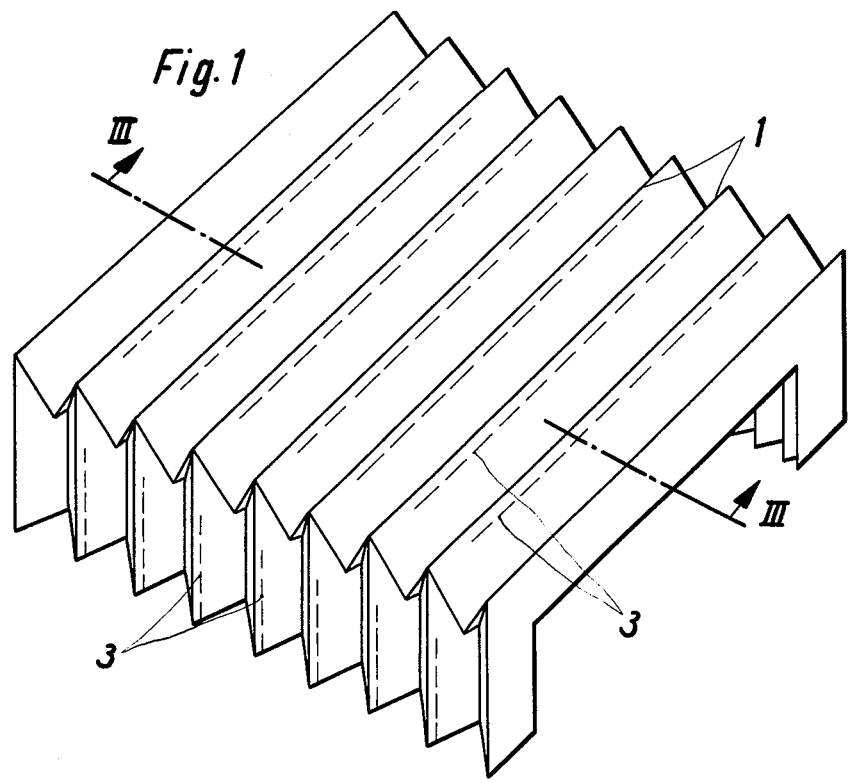
FIG. 1 is a perspective view of an article according to the invention.
Figure 2:
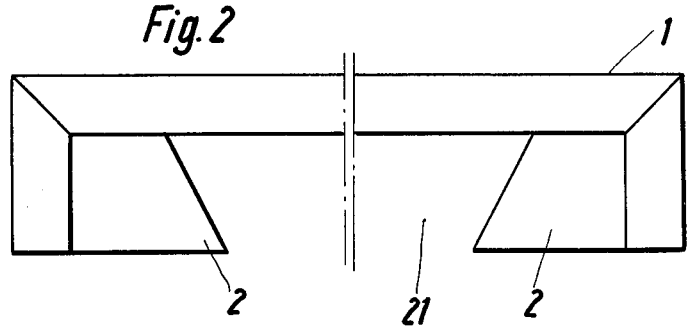
FIG. 2 is an end view of the article in FIG. 1.
Figure 3:
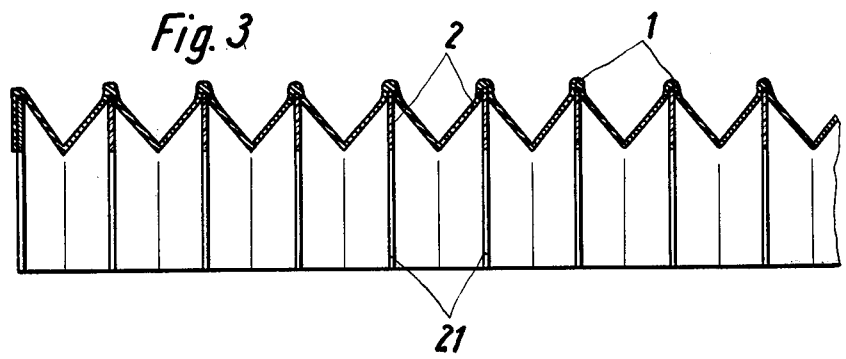
FIG. 3 is a section on line III—III of FIG. 1.

FIGS. 1–3 show the article in form of a channel-shaped member (i.e., a member having an open side). It should be understood, however, that the member could also be configurated otherwise, for instance be tubular.

The member, constructed of a single-ply material, is provided with a plurality of accordion-pleats having outer folded edge regions 1. The method of forming such accordion-type pleats is conventional and is known to those skilled in the arts of making bellows or concertina-type covers for machine slideways, just to mention a few possibilities.

Accommodated in these pleats are reinforcements 2 of sheet material which is flexible but resistant to kinking, e.g. synthetic plastic, spring steel or the like. In the illustrated embodiment they are sewn in place, by sewing through their outer marginal portions and through the edge regions 1 with a suitable thread or the like, thus forming seams 3 which, also according to the invention, are best sealed to preserve impermeability. This can be done with a synthetic plastic sealer, e.g. a polyvinylchloride material or the like.

The inner marginal portions of the reinforcements 2 may be provided with cut-outs 21 (shown of dovetail-shaped configuration in FIG. 2) so dimensioned and configurated as to correspond to the cross-section of a component (e.g. a guide track) which is to be protected by the novel article. Especially if these cut-outs are undercut as illustrated, and cooperate with appropriate portions of the component in question, undesired lifting-off of the article from the component is reliably prevented. Naturally, the configuration of the cut-outs can be different, as can indeed the outlines of the reinforcements 2 themselves.

It will be understood that each of the elements described above, or two or more together, may also find a useful application in other types of applications differing from the types described above.

While the invention has been illustrated and described as embodied in an accordion-pleated article, it is not intended to be limited to the details shown, since various modifications and structural changes may be made without departing in any way from the spirit of the present invention.

I claim:

1. A cover, particularly for covering a guide element of predetermined cross-section, comprising a single-ply elongated channel-shaped cover element provided with a plurality of accordion pleats, each having an outer folded edge region; and shape-retaining reinforcing members of flexible but kink-resistant sheet material mounted in said edge regions of at least some of said pleats and extending across the free cross-section of said cover element, said members being formed with cut-outs adapted to matingly interengage with the guide element being covered, whereby such mating interengagement prevents said cover from accidentally lifting off the guide element.

2. A cover as defined in claim 1; and further comprising additional ones of said reinforcing members mounted in the edge regions of the remaining ones of said pleats.

3. A cover as defined in claim 1, wherein said single-ply elongated element is of channel-shaped configuration.

4. A cover as defined in claim 1, wherein said single-ply elongated element is of fabric having an inner and outer side, at least one of which is provided with a coating of synthetic plastic material.

5. A channelshaped cover, particularly for covering a guide element of predetermined cross-section, comprising a single-ply elongated channel-shaped fabric cover coated with synthetic plastic material and provided with a plurality of accordion pleats each having an outer folded edge region and a seam region; and shape-retaining reinforcing members of flexible but kink-resistant sheet material mounted in at least some of said pleats and extending across the free cross-section of said cover, said members having cutouts adapted to matingly interengage with the guide element being covered and bounded by inner marginal portions facing the interior of said cover and outer marginal portions located within the confines of said edge regions, said outer marginal portions being sewn to said edge regions along the respective seam regions; and synthetic plastic sealing means sealing said seam regions.

* * * * *